Aug. 9, 1960 J. L. HOSTETTER 2,948,859

ISO-LEVEL PHASE INVERTER CIRCUIT

Filed Nov. 1, 1956

John L. Hostetter,
*INVENTOR.*

*BY.*

*ATTORNEY.*

2,948,859

Patented Aug. 9, 1960

2,948,859

ISO-LEVEL PHASE INVERTER CIRCUIT

John Linn Hostetter, Tucson, Ariz., assignor to Hughes Aircraft Company, Culver City, Calif., a corporation of Delaware Filed Nov. 1, 1956, Ser. No. 619,905

2 Claims. (Cl. 330—117)

The present invention relates in general to phase inverter circuits and more particularly to an inverter circuit that converts a single phase signal of any frequency, including a direct-current signal, into a two phase balanced push-pull signal, each half of which has the same output voltage level.

The two stages of a push-pull system should be excited by voltages of equal magnitude but of opposite phase. Since it is customary to use push-pull amplification only in power stages, this presents the problem of obtaining an exciting voltage balanced to ground from an amplifier that normally develops an output voltage that is unsymmetrical with respect to ground. The use of an interstage coupling transformer having a symmetrical center-tapped secondary is one widely used means for attaining an excitation voltage belanced to ground. However, transformers are expensive and have a limited frequency range.

A number of circuits have been devised for eliminating the need of an input transformer. In one type of circuit, for example, a portion of the output voltage produced by one output stage is used to drive a second output stage, the proportion of the output voltage used for excitation being the reciprocal of the gain of the second stage. This type of circuit, however, is satisfactory only if an accurate balance is unnecessary. In another prior art circuit, a two phase balanced push-pull signal is obtained by phase inversion of the input signal followed by biasing one of the two output stages sufficiently to bring its level to that of the other. The disadvantage of such a circuit is its unreliability because with the aging of tubes and the heating up of circuit elements, the output balance is destroyed.

It is thus seen that the use of the older circuits are usually accompanied by either unreliable output balance or unstable output levels, or both. In addition, these earlier circuits often present unequal output impedances to the succeeding circuit which, as is well known to those skilled in the art, is oftentime most undesirable. Finally, capacitive coupling is employed in many of these older circuits, which precludes operation of the circuits at relatively low frequencies, including direct-current.

It is, therefore, an object of the present invention to provide a circuit of the type that converts a single phase signal to a two phase signal.

It is another object of the present invention to provide a circuit that converts a single phase signal of any frequency, including a direct-current signal, into a two phase balanced push-pull signal, each half of which has the same output voltage level.

It is a further object of the present invention to provide a circuit that reliably produces a balanced and iso-level push-pull signal in response to a single-ended input signal.

It is an additional object of the present invention to provide an excitation circuit for push-pull amplifiers that presents equal output impedances to the amplifier.

A circuit that converts a single phase signal to a balanced iso-level push-pull signal and at the same time avoids the limitations of the prior art circuits may be obtained by summing, in appropriate proportions, the two output voltages constituting the push-pull signal and utilizing this summation voltage to drive the inverter stage of the circuit. More particularly, according to an embodiment of the present invention, a voltage divider circuit is electrically connected between the two output terminals of the circuit, the excitation signal used for driving the inverter stage that produces one of the two output voltages being provided by tapping off from the voltage divider. By tapping off at an appropriate point, the two output voltages can be balanced and made to have the same level.

Since the excitation voltage is a summation of two voltages, a change in either one of the two output voltages produces a corresponding change in the excitation voltage which, in turn, produces a corresponding change in the second output voltage sufficient to again bring the second output voltage to the same level as the first output voltage. Thus, once the two output voltages are brought to a balance and to the same voltage level, these conditions are thereafter automatically maintained by the circuit itself, thereby giving the circuit of the present invention the desired stability and reliability. Furthermore, the elements of the present circuit are all resistive in nature. Accordingly, the circuit can satisfactorily accommodate signals over a wide range of frequencies, including relatively low frequencies down to direct-current.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figure 1:
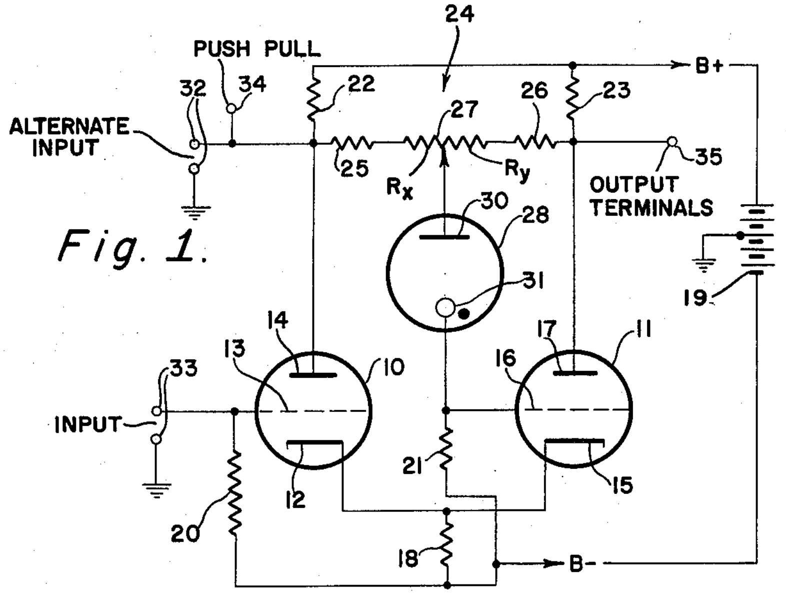
Fig. 1 is a schematic drawing of one embodiment of the present invention.

Referring now to the drawings, wherein like reference characters designate like or corresponding parts throughout the several views, there is shown in Fig. 1 a circuit that, in accordance with the present invention, converts a single phase input signal to a balanced iso-level push-pull output signal. As shown in the figure, the circuit comprises first and second electron tubes, such as triodes 10 and 11, triode 10 having a cathode 12, a control grid 13, and an anode 14 and triode 11 having a cathode 15, a control grid 16 and an anode 17. Cathodes 12 and 15 are electrically connected through a common cathode resistor 18 to the negative terminal of a battery 19, an intermediate terminal of which is referenced to ground. Similarly, control grids 13 and 16 are connected to the negative terminal of battery 19 through grid resistors 20 and 21, respectively. On the other hand, anodes 14 and 17 are electrically connected through anode resistors 22 and 23, respectively, to the positive terminal of battery 19. It is preferred that resistors 22 and 23 be of equal ohmic value in order that both anode voltages may more readily be made substantially equal to a reference potential such as ground.

A voltage divider network, generally designated 24, is electrically connected between anodes 14 and 17, the voltage divider network comprising a pair of resistors 25 and 26 and a potentiometer 27 electrically connected therebetween. The contact arm of the potentiometer divides the resistive element of the potentiometer into two parts which are designated $R_x$ and $R_y$ in the figure. Again, it is preferred that resistors 25 and 26 be of equal ohmic value in order to maintain anodes 14 and 17 at the same direct-current voltage level.

In order to reduce the voltage at the potentiometer contact arm to a level appropriate for the grid bias of tube 11, a voltage-regulator tube 28 having an anode 30 and a cathode 31 is electrically connected between the contact arm and control grid 16, anode 30 being connected to the contact arm and cathode 31 being connected to the control grid. Voltage-regulator tube 28 maintains a constant potential difference between the movable contact arm of potentiometer 27 and control grid 16. It should be noted, however, that other means may be employed to maintain a constant voltage between the movable contact arm and control grid 16, such as a battery or a dropping resistor.

Finally, the circuit of the present invention includes a pair of input terminals 32 and 33 and a pair of output terminals 34 and 35, input terminal 32 as well as output terminal 34 being electrically connected to anode 14, input terminal 33 being electrically connected to control grid 13, and output terminal 35 being electrically connected to anode 17. Thus, voltage divider network 24 is electrically connected between output terminals 34 and 35 as well as anodes 14 and 17. The single phase single-ended input signal may be applied to either one of input terminals 32 or 33, input terminal 32 being used if only inversion without gain is desired and input terminal 33 being used if over-all gain is desired. Furthermore, input terminal 33 is also used if it is desired to have equal output impedances since in the case of using input terminal 32 for an input, output terminal 34 is in parallel with the input supply impedance and its output impedance is, therefore, lower than the output impedance of output terminal 34.

In considering the operation, it will be assumed that the necessary quiescent conditions are met, namely, that the voltages at anodes 14 and 17 are both substantially equal to ground. Accordingly, a single phase signal, including a direct-current signal, is applied to either input terminal 32 or input terminal 33 depending on whether or not signal gain is desired, as previously mentioned. If the input signal is applied to input terminal 32, it will be obvious that the signal must be introduced at the voltage level desired for the voltages produced at output terminals 34 and 35 unless, of course, low frequency response is unnecessary, in which case capacitive coupling in and out may be used. On the other hand, if the input signal is applied to input terminal 33, the applied signal voltage level must be such that when the applied signal is amplified by tube 10, the voltage level of the amplified signal produced at anode 14 is that desired at the output terminals.

Considering now the operation of the circuit, when an input signal is applied to input terminal 32, the voltage variations of the input signal are also developed at output terminal 34. In other words, the input signal applied to input terminal 32 is one half the push-pull signal produced between output terminals 34 and 35. As a result, a portion of the input signal is produced at the movable contact arm of potentiometer 27 or, stated differently, voltage variations of smaller magnitude but otherwise identical with the variations of the input signal are produced at the contact arm. These voltage variations, hereinafter referred to as the excitation signal, are applied to control grid 16 and, therefore, amplified and inverted by tube 11, the amplified excitation signal appearing both at output terminal 35 and anode 17. Thus, the signals at output terminals 34 and 35 are 180° out of phase with each other and are of proximate voltage amplitudes. The voltage amplitudes of the two output signals may be made exactly equal by moving the contact arm of potentiometer 27 toward anode 14, that is, toward output terminal 34, until the magnitude of the excitation voltage applied to control grid 16 is such that the voltage amplitude of the amplified signal produced at output terminal 35 is exactly equal to the voltage amplitude of the output signal at output terminal 34.

It should be noted that the two output voltages produced at output terminals 34 and 35 are linearly distributed along voltage divider network 24, each output voltage being of maximum magnitude at its associated output terminal and of zero magnitude at the other output terminal, the magnitude of the output voltage varying linearly therebetween. Thus, the magnitude of the voltage at any point along voltage divider network 24 and in particular along the resistive element of potentiometer 27 is the sum of two voltages. This means that once the voltage amplitudes of the signals at output terminals 34 and 35 have been adjusted to be equal, they will thereafter remain equal because any change in the amplitude of one output signal will cause a corresponding change in the excitation voltage applied to control grid 16 such that the two output voltages will automatically be brought to the same amplitude again.

For example, if the magnitude of the voltage at output terminal 34 should decrease slightly for some reason, then the magnitude of the excitation voltage applied to control grid 16 would correspondingly decrease, the change in the magnitude of the excitation voltage being such that when the excitation signal is amplified, the amplified signal at output terminal 35 is again at exactly the same magnitude as the signal at output terminal 34. On the other hand, if the magnitude of the voltage at output terminal 34 should increase slightly, then there would be a corresponding increase in the magnitude of the excitation voltage and, as before, the amplified signal at output terminal 35 would again be brought to the same magnitude as the signal at output terminal 34. The circuit similarly adjusts for any slight variations in the magnitude of the output signal produced at output terminal 35. Stated differently, the voltage-regulator tube 28 provides a floating reference at an appropriate direct-current level for the grid 16 of tube 11 such that the signals applied between cathode 15 and grid 16 automatically adjusts the magnitude of the output signal produced at output terminal 35 so that the push-pull signal produced between output terminals 34 and 35 is at all times balanced with respect to the tap of potentiometer 27.

If the single phase input signal is applied to input terminal 33 instead of input terminal 32 as above, then the input signal is first amplified and inverted, the amplified input signal appearing at output terminal 34. In this case, the input signal may be of much smaller magnitude than previously since it is being amplified by triode 10. However, the magnitude of the signal applied to input terminal 33 should be such that the desired output signal magnitude is attained at output terminal 34. Once the amplified input signal is produced at output terminal 34, the operation of the circuit is exactly the same as in the previous case wherein the input signal was applied to input terminal 32. Accordingly, no further description of the operation is deemed necessary.

The operation of the circuit of Fig. 1 may be mathematically expressed as follows:

If, (*a*) $E_{34}$ is the output voltage developed at output terminal 34;

(*b*) $E_{35}$ is the output voltage developed at output terminal 35, $E_{35}$ being substantially of the same amplitude and 180° out of phase with $E_{34}$;

(*c*) $E_{11}$ is the excitation voltage applied to control grid 16 of tube 11;

(*d*) $K_2$ is the gain of tube 11;

(*e*) $R_{23}$ and $R_{23}$ represent resistors 22 and 23, respectively, the ohmic value of each being small in comparison with resistor 21;

(*f*) $R_{25}$ and $R_{26}$ represent resistors 25 and 26, respectively; and (*g*) $R_x$ and $R_y$ represent the variable resistive portions of the resistive element of potentiometer 27, the values of $R_x$ and $R_y$ being determined by the position of the potentiometer contact arm.

Now, if $R_y+R_{26}$ is made greater than $R_x+R_{25}$ by an amount such that $$\frac{(R_y+R_{26})-(R_x+R_{25})}{(R_y+R_{26})+(R_x+R_{25})}=\frac{1}{K_2} \quad (1)$$

then, a condition will be reached such that $$E_{34}=-E_{35} \quad (2)$$

This can be proven as follows:

Assuming that resistor 21 is a negligible load and applying the superposition theorem, $$E_{11}=E_{34}\frac{R_y+R_{26}}{(R_y+R_{26})+(R_x+R_{25})}+E_{35}\frac{R_x+R_{25}}{(R_y+R_{26})+(R_x+R_{25})} \quad (3)$$

When $E_{34}=-E_{35}$, it follows that $$E_{11}=-E_{35}\frac{R_y+R_{26}}{(R_y+R_{26})+(R_x+R_{25})}+E_{35}\frac{R_x+R_{25}}{(R_y+R_{26})+(R_x+R_{25})} \quad (4)$$

Consequently, $$E_{11}=-E_{35}\frac{(R_y+R_{26})-(R_x+R_{25})}{(R_x+R_{25})+(R_y+R_{26})} \quad (5)$$

By definition, $$K_2=-\frac{E_{35}}{E_{11}} \quad (6)$$

Therefore, $$-\frac{E_{35}}{E_{11}}=K_2=\frac{(R_x+R_{25})+(R_y+R_{26})}{(R_y+R_{26})-(R_x+R_{25})} \quad (7)$$

and, $$\frac{1}{K_2}=\frac{(R_y+R_{26})-(R_x+R_{25})}{(R_y+R_{26})+(R_x+R_{25})} \quad (8)$$

Thus the requirements for balance, equal-level outputs and flat frequency response down to and including zero cycles per second are satisfied.

If input terminal 32 is to be used exclusively, then the circuit of Fig. 1 may be simplified to the circuit shown in Fig. 2 which again produces iso-level output voltages in push-pull. By comparing the circuits of Figs. 1 and 2, it will be seen that the circuit of Fig. 2 may be derived from the circuit of Fig. 1 simply by disconnecting tube 10 and resistors 18, 20 and 22 from the latter. In every other respect, the two circuits are identical.

Figures 2, 3:
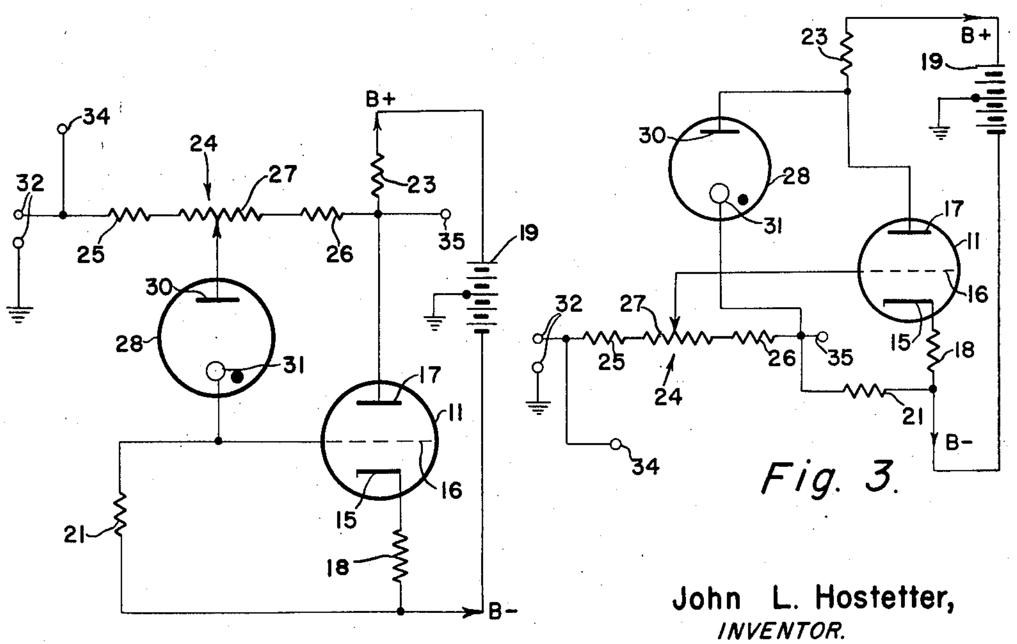
Fig. 2 is a schematic drawing of another embodiment of the present invention.
Fig. 3 is a schematic drawing of a third embodiment of the present invention.

The operation of the circuit of Fig. 2 is also the same as that of the circuit of Fig. 1. Thus, when a signal is applied to input terminal 32, a portion of the applied signal is applied to control grid 16 of tube 11 which, as before, amplifies and inverts the excitation voltage. By suitably positioning the pontentiometer contact arm, the two voltages constituting the push-pull signal produced between output terminals 34 and 35 can be balanced and made to be of equal level.

In the circuit of Fig. 2, the input and output voltages are generally at plate or anode level. A variation of the circuit of Fig. 2 that is advantageous because it permits an input at normal grid level and an output at the same grid level is the circuit shown in Fig. 3. As shown in the figure, cathode 15 is connected through resistor 18 to the negative terminal of battery 19 and anode 17 is connected through resistor 23 to the positive terminal of battery 19, the anode 17 also being connected in parallel through capacitor 29 and voltage-regulator tube 28 and then in series through resistor 21 to the negative terminal of battery 19. Control grid 16 is connected through the contact arm of potentiometer 27 to voltage divider network 24 which is connected between output terminals 34 and 35. The input terminal, terminal 32, is connected to resistor 25 and output terminal 34.

In essence, the operation of the circuit of Fig. 3 is the same as the operation of the two previous circuits of Figs. 1 and 2 and, therefore, will not be presented in order to avoid redundancy.

Having thus described the invention, what is claimed as new is:

1. An electronic circuit for producing a balanced iso-level push-pull output signal between first and second output terminals in response to a single phase input signal applied to either a first or second input terminal, said first input and output terminals being electrically connected to each other, said circuit comprising: first and second electron tubes having first and second cathodes, respectively, first and second control grids, respectively, and first and second anodes, respectively, said first and second anodes being electrically connected to the first and second output terminals, respectively, and said first control grid being electrically connected to the second input terminal; first and second sources of negative and positive direct-current voltage, respectively, each of said sources being referenced to a substantially fixed reference potential level; a common cathode resistor electrically connected between said first source of voltage and said first and second cathodes; first and second anode load resistors electrically connected between said first and second anodes, respectively, and said second source of voltage, said first and second anode resistors being substantially of equal ohmic value; first and second grid resistors electrically connected between said first and second control grids, respectively, and said first source of voltage; first and second voltage divider resistors of substantially equal ohmic value and a potentiometer electrically connected therebetween, said first and second voltage divider resistors and said potentiometer being electrically connected between said first and second anodes; and means electrically connected between the movable contact arm of said potentiometer and said second control grid for maintaining a substantially constant potential difference between said contact arm and said control grid.

2. The electronic circuit as defined in claim 1 wherein said means electrically connected between the movable contact arm of said potentiometer and said second control grid for maintaining a substantially constant potential difference between said contact arm and said control grid comprises a voltage-regulator tube having an anode and a cathode, said anode being electrically connected to said movable contact arm of said potentiometer and said cathode being electrically connected to said second control grid.

References Cited in the file of this patent

UNITED STATES PATENTS

| | | |
|---|---|---|
| 2,109,760 | Urtel | Mar. 1, 1938 |
| 2,550,990 | Gilbert | May 1, 1951 |